United States Patent [19]

Ueda et al.

[11] Patent Number: 4,956,191

[45] Date of Patent: Sep. 11, 1990

[54] METHOD OF PREPARING A CARBONATED BEVERAGE CONTAINING ASPARTAME

[75] Inventors: Shinji Ueda; Koichi Takizawa, both of Kawasaki, Japan

[73] Assignee: Ajinomoto Co., Inc., Tokyo, Japan

[21] Appl. No.: 275,603

[22] Filed: Nov. 23, 1988

Related U.S. Application Data

[63] Continuation of Ser. No. 30,386, Mar. 26, 1987, abandoned.

[30] Foreign Application Priority Data

Apr. 1, 1986 [JP] Japan .................. 61-74834

[51] Int. Cl.$^5$ .............................. A23L 2/40
[52] U.S. Cl. ....................... 426/330.3; 426/477; 426/548; 426/590
[58] Field of Search ............... 126/548, 590, 115, 477, 126/329, 575, 565, 442, 330.3

[56] References Cited

U.S. PATENT DOCUMENTS

| | | | |
|---|---|---|---|
| 3,294,544 | 12/1966 | Stanko | 426/565 |
| 3,365,304 | 1/1968 | Gutterman | 426/565 |
| 3,476,571 | 11/1969 | Block | 426/575 |
| 3,761,285 | 9/1973 | Nagasawa . | |
| 3,845,231 | 10/1974 | Nagasawa et al. | 426/565 |
| 3,996,389 | 12/1976 | Osborne | 426/565 |
| 4,009,289 | 2/1977 | Roos et al. | 426/330.3 |
| 4,025,655 | 5/1977 | Whyte | 426/115 |
| 4,221,291 | 9/1980 | Hunt | 426/115 |

FOREIGN PATENT DOCUMENTS 259169 12/1985 Japan .

Primary Examiner—Carolyn Paden
Attorney, Agent, or Firm—Oblon, Spivak, McClelland, Maier & Neustadt

[57] ABSTRACT

A carbonated beverage is produced which comprises a low-calorie sweetener such as aspartame, and a cold water-soluble natural gum, particularly gum arabic. It is a low calorie beverage which possesses excellent palatability and a reduced tendency to cause dental caries.

6 Claims, No Drawings

METHOD OF PREPARING A CARBONATED BEVERAGE CONTAINING ASPARTAME

This application is a continuation of application Ser. No. 07/030,386, filed on Mar. 26, 1987, now abandoned.

BACKGROUND OF THE INVENTION

1. Field of the Invention:

This invention relates to a carbonated beverage, and more specifically to a carbonated beverage containing a low-calorie sweetner which is low calorie, has a reduced tendency to cause dental caries, and possesses excellent palatability.

2. Discussion of the Background:

In recent years, drinks and health foods which are low in calorie and have a reduced tendency to cause caries have proliferated, and there has thus been a tendency to utilize low-calorie sweetners such as aspartame in carbonated beverages.

Carbonated beverages containing many low-calorie sweetening agents are frequently inferior in taste or flavor to those containing sugar. For example, carbonated beverages containing saccharin or a Stevia extract have considerably lower palatability than those which contain sugar because the former leaves a particularly bitter after-tase. In contrast to other low-calorie sweeteners, aspartame is sweet-tasting and possesses a flavor increasing effect. However, carbonated beverages which contain blends of saccharin or the Stevia extract with aspartame tend to be less organoleptically pleasing than those containing sugar.

In order to remedy these organoleptic characteristics, attempts have been made to improve the sweetness of the compounds, and many reports have been made on the improvement of sweeteners such as saccharin, the Stevia extract, Acesultame and aspartame.

In the course of studying the organoleptic characteristics of a carbonated beverage containing aspartame, the present inventors determined that improving sweetness alone does not remedy the difference of its organoleptic characteristics with that of a carbonated beverage containing sugar. Further investigations led to the discovery that in the carbonated beverage containing aspartame, carbon dioxide gas escapes more easily after bottle opening, than from the beverage containing sugar. Therefore, the refreshness which is ascribable to the dissolved carbon dioxide gas is more rapidly impaired and the palatability of the beverage is more rapidly reduced.

SUMMARY OF THE INVENTION

It is an object of this invention to provide a carbonated beverage containing a sweetening agent of a high degree of sweetness, such as aspartame, which possesses an excellent refreshness, is low calorie and has a low tendency to cause caries, and to prevent the rapid loss of dissolved carbon dioxide after bottle opening.

The present inventors have made extensive investigations into the prevention of the rapid loss of the dissolved carbon dioxide gas in carbonated beverages containing low-calorie sweeteners, and have found that natural gums effectively prevent the decrease of carbon dioxide gas.

Thus, according to this invention, there is provided a carbonated beverage which contains a low-calorie sweetener as a part or the whole of its sweetener content and a cold water-soluble natural gum.

DETAILED DESCRIPTION OF THE PREFERRED EMBODIMENTS

The natural gum used in this invention includes edible gums such as ghatti gum, gum arabic, guargum, tamarind gum and xanthan gum, carragheenan and pectin. They may be used either singly or in combination.

The optimum concentration of the natural gum differs depending upon its type, but generally its concentration in a carbonated beverage is about 5 to 50 mg/dl. If the concentration of the gum increases beyond this, the carbonated beverage increases in consistency, is viscous to the palate and its refreshness decreases. Furthermore, bubbling will thus persist during pouring into a glass or within the mouth, and thus its refreshness is reduced. On the other hand, if the concentration of the gum is too low, the effect of preventing a decrease of the concentration of dissolved carbon dioxide cannot be obtained.

In a model system of a cider-like carbonated drink using various natural gums, the percent residue of dissolved carbon dioxide gas was determined. The measurement was made by opening a well-chilled (5°–8° C.) can of the carbonated beverage, and leaving it to stand for a fixed period of time in a constant-temperature vessel at 37° C. The concentrations of dissolved $CO_2$ before and after the can opening were measured by a carbon dioxide meter (Model AI-1003, made by Ishikawa Seisakusho). The results are expressed by $$\text{Percent residue of dissolved } CO_2 = \frac{CO_2 \text{ concentration after standing}}{\text{initial } CO_2 \text{ concentration}} \times 100$$

Smaller percent residue values indicate greater ease with which $CO_2$ escaped. The results are shown in Table 1.

TABLE 1

| | Amounts added | | | | Percent of residue of dissolved |
|---|---|---|---|---|---|
| Sample | Sugar (g/dl) | Aspartame (mg/dl) | Natural gum (mg/dl) | pH | $CO_2$ (%)* |
| 1 | 10 | — | — | 3.9 | 40.4 |
| 2 | — | 50 | — | 3.9 | 31.8 |
| 3 | — | 50 | pectin 10 | 3.9 | 36.9 |
| 4 | — | 50 | λ-carragheenan 10 | 3.9 | 36.8 |
| 5 | — | 50 | xanthan gum 10 | 3.9 | 34.9 |
| 6 | — | 50 | tamarind gum 10 | 3.9 | 34.3 |
| 7 | — | 50 | gum arabic 10 | 3.9 | 39.1 |

*On standing at 37° C. for 60 minutes.

The above samples were subjected to an organoleptic test, and the results are shown in Table 2.

TABLE 2

| | Organoleptic evaluation (n=5) | | | |
|---|---|---|---|---|
| Sample | Relative Degree of Carbonation* | Pleasingness of feel of carbon dioxide* | Relative Degree of Sweetness* | Overall evaluation** |
| 1 | 0 | 0 | 0 | 5.8 |
| 2 | 1.4 | 0.4 | −0.4 | 4.6 |
| 3 | 1.2 | 0.8 | 0 | 5.3 |

TABLE 2-continued

| | Organoleptic evaluation (n=5) | | | |
|---|---|---|---|---|
| Sample | Relative Degree of Carbonation* | Pleasingness of feel of carbon dioxide* | Relative Degree of Sweetness* | Overall evaluation** |
| 4 | 0.2 | 0.1 | −0.4 | 4.6 |
| 5 | 0.4 | −1.1 | −0.4 | 2.9 |
| 6 | 0.8 | −0.4 | −0.6 | 3.7 |
| 7 | 0.6 | 0.2 | 0 | 5.4 |

Ratings:
*A rating of 0 is given to sample 1, and the strength is rated in ± 2 grades.
**Ratings of 11 grades from 0 (bad taste) to 5 (ordinary) to 10 (good taste) are given.

As shown by the results of Table 1, the percent residue of dissolved carbon gas is high in all systems containing natural gums, and a model system containing gum arabic is closest to one containing sugar. In respect of organoleptic pleasingness, a system containing gum arabic is best, and nearly the same evaluation as for one containing sugar is assigned to it.

The carbonated beverage to which the present invention pertains includes clear carbonated beverages, such as cola, cider-like soft drinks and ginger ale, and turbid carbonated beverage which contain components such as pectin or pulp derived from fruit juices, namely carbonated beverages containing fruit juices. The present invention is especially effective on the clear carbonated beverages.

A low-calorie sweetener having a high degree of sweetness such as aspartame, Acesultame, the Steavia extract and derivatives is used either as the sole or part of a blend in the sweetener used in the carbonated beverage. One or a combination of two or more low-calorie sweeteners may be used. The proportions of the low-calorie sweetener in the entire sweeteners is 30 to 90%, preferably 50 to 80%, in terms of sweetness based on the total sweetness. When used in combination with another sweetening agent, such as sucrose, glucose, fructose, isomerized sugar, sugar alcohols such as sorbitol, maltitol and xylitol, reduced maltose, and reduced starch decomposition products, its proportion is determined by considering the desired strength of sweetness and the respective stengths of the sweetness of these sweeteners.

The carbonated beverage of this invention may be produced in accordance with a known method. For example, sweetners such as aspartame may be added as a powder and dissolved, or may be mixed in the form of a solution with other ingredients. The natural gum may also be added in the conventional manner, similar to aspartame addition.

Carbon dioxide gas in a predetermined amount may be forced into bottles by a carbonator.

By including a natural gum, particularly gum arabic, into a carbonated beverage containing a low-calorie sweetener in such a low concentration as to scarcely cause a thickening effect, there can be obtained a carbonated beverage having high palatability comparable to one containing sugar and a reduced tendency to decrease the amount of dissolved carbon dioxide gas after bottle opening.

The following examples illustrate the present invention further.

Other features of the invention will become apparent in the course of the following description of exemplary embodiments which are given for illustration of the invention and are not intended to be limiting thereof.

EXAMPLE 1

A lemon-lime carbonated beverage was prepared in a customary manner in accordance with the recipe shown in Table 3. The samples obtained were evaluated, and the results are shown in Table 4.

TABLE 3

| Sample | Sugar (g/dl) | AP (mg/dl) | Gum arabic (mg/dl) | Citric acid (g/dl) | Lemon-Lime flavor (ml/dl) |
|---|---|---|---|---|---|
| 1 | 10 | — | — | 0.22 | 0.1 |
| 2 | — | 50 | — | 0.22 | 0.2 |
| 3 | — | 50 | 10 | 0.22 (pH 3.9) | 0.1 |

TABLE 4

| Sample | Percent residue of dissolved $CO_2$ (%)[1] | Organoleptic evaluation (overall) |
|---|---|---|
| 1 | 51.1 | 6.4 |
| 2 | 41.3 | 5 |
| 3 | 49.3 | 5.4 |

[1] On standing at 37° C. for 30 minutes

Sample 3 (containing gum arabic) showed nearly the same percent residue of dissolved $CO_2$ as sample 1 (containing sugar) without impairing the palatability of sample 2 (containing AP), and the escaping of dissolved $CO_2$ was prevented.

EXAMPLE 2

A grapefruit carbonated beverage was prepared in a customary manner in accordance with the recipe shown in Table 5. The samples obtained were evaluated, and the results obtained are shown in Table 6.

TABLE 5

| | Components | | | | |
|---|---|---|---|---|---|
| Sample | Liquid sugar of fructose and glucose (g/dl) | AP (mg/dl) | Gum arabic (mg/dl) | Citric acid (g/dl) | Grapefruit flavor (ml/dl) |
| 1 | 1.25 | — | — | 0.22 | 0.2 |
| 2 | 1.25 | 45 | — | 0.22 | 0.2 |
| 3 | 1.25 | 45 | — | 0.22 (pH 3.9) | 0.2 |

TABLE 6

| Sample | Percent residue of dissolved $CO_2$ (%)[1] | Organoleptic evaluation (overall) |
|---|---|---|
| 1 | 50.4 | 5.6 |
| 2 | 41.5 | 5.1 |
| 3 | 50.0 | 5.4 |

[1] On standing at 37° C. for 30 minutes

Sample 3 (containing gum arabic) showed nearly the same percent residue of dissolved $CO_2$ as sample 1 (containing sugar) without impairing the palatability of sample 2 (containing AP-isomerized sugar), and the escaping of dissolved $CO_2$ was prevented.

EXAMPLE 3

A cider-like carbonated beverage was prepared in a customary manner in accordance with the recipe shown in Table 7. The samples obtained were evaluated, and the results are shown in Table 8.

TABLE 7

| Sample | Components | | | | |
|---|---|---|---|---|---|
| | Sugar (g/dl) | AP (mg/dl) | Gum arabic (mg/dl) | Citric acid (g/dl) | Cider-flavor (ml/dl) |
| 1 | 10 | — | — | 0.14 | 0.1 |
| 2 | — | 45 | — | 0.14 | 0.1 |
| 3 | — | 45 | 10 | 0.14 (pH 3.9) | 0.1 |

TABLE 8

| Sample | Percent residue of dissolved $CO_2$ (%)[1] | Organoleptic evaluation (overall) |
|---|---|---|
| 1 | 40.4 | 6.4 |
| 2 | 31.8 | 5 |
| 3 | 39.1 | 5.8 |

[1] On standing at 37° C. for 30 minutes

Sample 3 (containing gum arabic) had a higher organoleptic rating and a higher percent residue of dissolved $CO_2$ than sample (2) containing AP, and had the same dissolved $CO_2$ escape as sample 1 (containing sugar).

EXAMPLE 4

A cider-like carbonated beverage was prepared in a customary manner in accordance with the recipe indicated in Table 9. The samples obtained were evaluated, and the results obtained are shown in Table 10.

TABLE 10

| Sample | Percent residue of dissolved $CO_2$ (%)[1] | Organoleptic evaluation (overall) |
|---|---|---|
| 1 | 50.8 | 6 |
| 2 | 42.4 | 4.6 |
| 3 | 50.2 | 5 |

Sample 3 (containing gum arabic) had the same percent residue of dissolved $CO_2$ as sample 1 (containing sugar) without impairing the palatability of sample 2 containing AP-stevia derivative, and the escape of dissolved $CO_2$ was prevented.

Obviously, numerous modifications and variations of the present invention are possible in light of the above teachings. It is therefore to be undestood that within the scope of the appended claims, the invention may be practiced otherwise than as specifically described herein.

What is claimed as new and desired to be secured by Letters Patent of the United States is:

1. A method of retaining dissolved carbon dioxide gas in a packaged liquid carbonated beverage containing aspartame as a main sweetening component, the method comprising adding 5–50 mg/dl of a cold water-soluble natural gum selected from the group consisting of ghatti gum, gum arabic, guar gum, tamarind gum, xanthan gum, carragheenan gum and a combination thereof.

2. The method of claim 1, wherein said natural gum is gum arabic.

3. The method of claim 1, wherein said liquid carbonated beverage is a clear or turbid carbonated beverage.

4. The method of claim 3, wherein said clear carbonated beverage is a cola, cider-based soft drink or ginger ale.

5. The method of claim 3, wherein said turbid carbonated beverage is a beverage containing fruit juice.

6. The method of claim 3, wherein said aspartame comprises about 30 to 90% of the total sweetener based on the total sweetness.

* * * * *

TABLE 9

| Sample | Components | | | | | |
|---|---|---|---|---|---|---|
| | Sugar (g/dl) | AP (mg/dl) | Glucosyl stevioside (mg/dl) | Gum arabic (mg/dl) | Citric acid (g/dl) | Cider-flavor (ml/dl) |
| 1 | 10 | — | — | — | 0.14 | 0.1 |
| 2 | — | 30 | 36.4 | — | 0.14 | 0.1 |
| 3 | — | 30 | 36.4 | 10 | 0.14 (pH 3.9) | 0.1 |